US006729117B2

(12) United States Patent  
Frazer

(10) Patent No.: US 6,729,117 B2  
(45) Date of Patent: May 4, 2004

(54) SPINDLE ASSEMBLY FOR ROTARY MOWER

(76) Inventor: David S. Frazer, 1466 M63, Benton Harbor, MI (US) 49022

( * ) Notice: Subject to any disclaimer, the term of this patent is extended or adjusted under 35 U.S.C. 154(b) by 0 days.

(21) Appl. No.: 09/944,741

(22) Filed: Aug. 31, 2001

(65) Prior Publication Data

US 2002/0043062 A1 Apr. 18, 2002

Related U.S. Application Data

(60) Provisional application No. 60/229,570, filed on Aug. 31, 2000.

(51) Int. Cl.[7] .......................... A01D 69/03; F01C 21/04
(52) U.S. Cl. ...................... 56/119; 418/102; 418/206.8
(58) Field of Search ................................ 56/11.9, 12.3, 56/13.5, 14.7, 16.7, DIG. 11; 418/102, 181, 206.6, 206.7, 206.8; 92/80, 86, 153, 154; 60/456

(56) References Cited

U.S. PATENT DOCUMENTS

| | | | | |
|---|---|---|---|---|
| 3,852,945 A | * | 12/1974 | Berry et al. | ................... 56/12.7 |
| 5,062,259 A | * | 11/1991 | Lipscombe | ................... 56/255 |
| 5,210,997 A | * | 5/1993 | Mountcastle, Jr. | ............ 56/15.2 |
| 6,010,321 A | * | 1/2000 | Forsythe et al. | ............ 418/102 |
| 6,389,786 B1 | * | 5/2002 | Bergsten et al. | ............. 56/17.5 |
| 6,484,481 B1 | * | 11/2002 | Langworthy et al. | ............ 56/6 |

FOREIGN PATENT DOCUMENTS

JP    63009681    * 1/1988

* cited by examiner

Primary Examiner—Thomas B. Will  
Assistant Examiner—Nathan Mammen  
(74) Attorney, Agent, or Firm—Waters & Morse, P.C.

(57) ABSTRACT

A spindle assembly for a rotary mower comprises a spindle that is drivingly connected between an output shaft of a hydraulic motor or other rotary power source and a horizontal blade assembly, and a spindle housing that rotatably supports the spindle for rotation and thrust loads. The spindle is formed from conventional steel rod stock and is machined to produce an upper end of reduced diameter. An impeller and thrust washer fits on the narrower upper end of the spindle and is held in place by a tapered snap ring that fits in a tapered groove in the spindle. In at least one embodiment, radial grooves on the washer facilitate oil flow and assist to impel or pump oil or hydraulic fluid outwardly as the washer rotates. In various embodiments, case drain oil pressure or oil pressure produced by the washer causes oil flow over the spindle assembly bearing surfaces. The spindle assembly can include an oil leak detection passageway. The spindle can be lubricated with oil from the motor or its own oil supply, which can be in a separate reservoir, in a reservoir in the motor casing, or in a reservoir in a lubrication block mounted between the motor and the spindle housing. The spindle housing is formed of an aluminum alloy or other material that can serve as a plain bearing for the steel spindle.

27 Claims, 17 Drawing Sheets

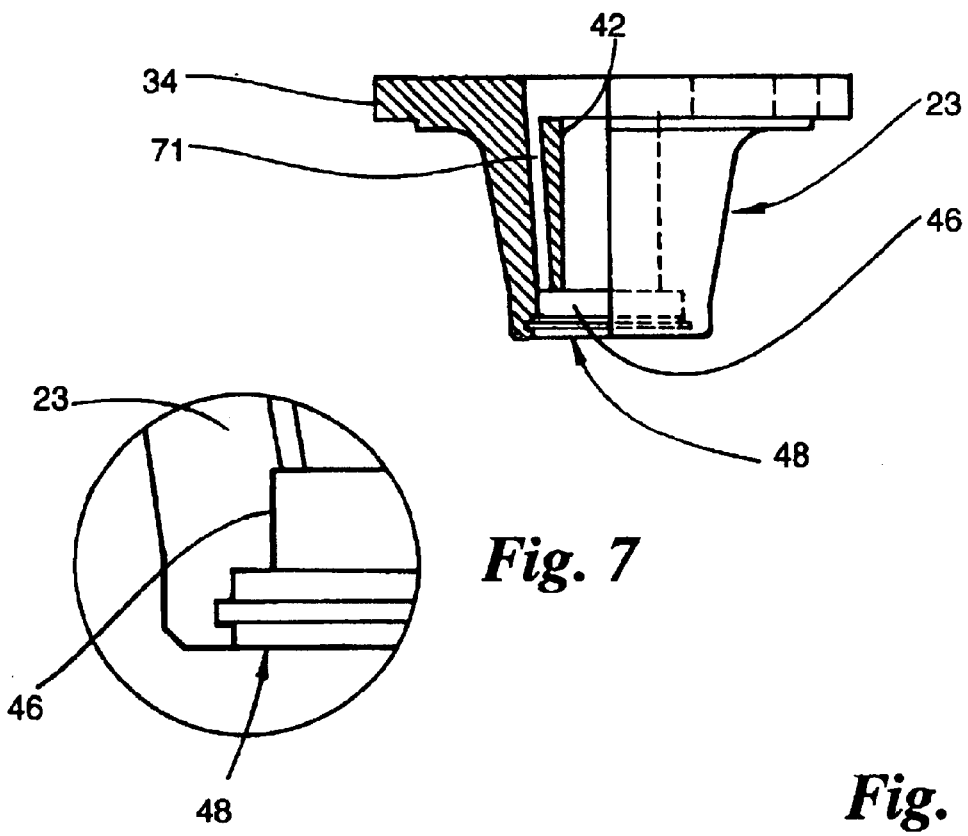
*Fig. 5*
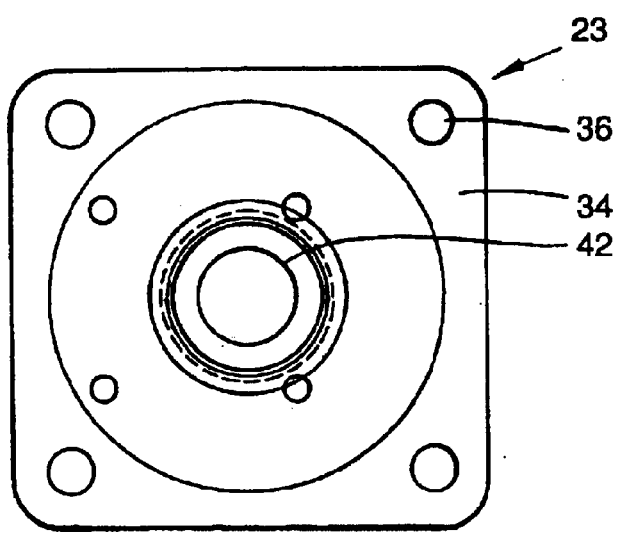
*Fig. 7*
*Fig. 6*

SPINDLE ASSEMBLY FOR ROTARY MOWER

CROSS-REFERENCES TO RELATED APPLICATIONS

This application is based on and claims the priority date of co-pending provisional patent application Ser. No. 60/229,570, filed Aug. 31, 2000.

BACKGROUND OF THE INVENTION

Larger rotary lawnmowers sometimes employ multiple blades or decks. Usually the blades are rotated by belts and pulleys or shaft and gear drive mechanisms powered by a single gasoline or diesel engine. Other systems employ a single hydraulic motor for each blade. This eliminates most of the mechanical components and simplifies the system considerably.

Hydraulic motors employed in such systems typically are vertically oriented, with the motor being mounted on a spindle housing deck and an output shaft on the motor extending vertically through the deck to be connected directly or indirectly with a horizontal blade.

Rotary mower blades and hence the motors that drive them are subjected to considerable stress during operation. Motors and spindles are required to run for a long period of time without requiring service, and both are subjected to unbalanced loads. Motors and spindles are also subjected to shock loads when the blades strike hidden objects and the like. Testing for such drive systems includes longevity, unbalanced loads, and a shock load, sometimes referred to as a stake test, wherein the motor/blade is stopped suddenly by direct contact with a fixed stake.

A characteristic of a hydraulic motor is that the size and cost of the motor is generally related more or less directly with the diameter of the output shaft of the motor. For a hydraulic motor to drive a rotary blade directly while still passing the necessary unbalanced load and shock tests, it is necessary to employ a hydraulic motor having an output shaft having a relatively large diameter. This in turn requires a larger hydraulic motor, reducing system efficiency and increasing the cost of the system substantially.

In order to overcome this problem, and for other reasons, it is customary to connect a hydraulic motor with a rotary mower blade by means of a spindle assembly, wherein a larger diameter spindle extends between the hydraulic motor output shaft and the blade, with the blade being mounted on the spindle. The spindle, in such a situation, is mounted in a spindle housing and is suspended in suitable bearings for rotation in the housing. In testing, it has been found that when ball or roller bearings are used, shock loads cause impact hardening of the bearings and result in premature failure. To overcome this problem, some spindle assemblies employ plain bearing inserts or bushings instead of ball or roller bearings. Such bushings often employ so-called "top hat" (flanged) bearings, which incorporate a thrust bearing on an end of the bushing. The bushings are lubricated by oil (hydraulic fluid) from the hydraulic motor, with the output shaft seal of the hydraulic motor being removed to permit oil transfer from the hydraulic motor to the spindle assembly. The spindle assemblies work adequately but are at the present time complicated and expensive and are generally designed to be an integral part of a particular brand of hydraulic motor. Also, serious oil leakage can occur if a spindle seal fails in such a device. The oil can destroy a considerable amount of fine turf on a golf course or the like before the seal failure is noted.

An object of the present invention is to provide a simpler, less expensive spindle assembly for a hydraulic motor, wherein the spindle assembly can be fitted to virtually any brand of hydraulic motor and the likelihood of substantial undetected oil leakage is reduced.

SUMMARY OF THE INVENTION

In accordance with the present invention, a spindle assembly for a rotary mower operated by a hydraulic motor comprises a spindle that is drivingly connected between an output shaft of a hydraulic motor and a horizontal blade assembly, and a spindle housing that rotatably supports the spindle for rotation and thrust loads. The spindle housing (or body) is formed of an aluminum alloy. A bore in the housing fits closely over the spindle and serves as a plain bearing for rotatably supporting the spindle. The spindle assembly functions adequately without any bearing inserts between the housing and the spindle, although bearing inserts at the ends or at least the lower end of the spindle can be employed in order to achieve higher load bearing capabilities. The spindle of the present invention is formed from conventional rod stock and is machined to produce an upper end of reduced diameter.

An impeller and thrust washer (which can serve as an impeller or thrust washer or both) fits on a narrower upper end of the spindle and is held in place by a tapered snap ring (also called a circlip) that fits in a tapered groove in the spindle. The tapered groove causes the tapered snap ring to tightly hold the washer in place so it is urged to rotate with the spindle. Radial grooves are formed on at least a lower side of the washer and preferably on both sides. These assist to impel or pump oil or hydraulic fluid outwardly as the washer rotates.

In one aspect of the invention, an oil circulation channel is formed in the housing so as to extend from a position adjacent the outer edge of the impeller washer downwardly and inwardly to a lower end of the spindle housing adjacent the spindle. Oil received downwardly from the hydraulic motor flows outwardly over the outer edges of the impeller washer. The oil then flows downwardly through the oil circulation channel to the junction of the spindle and spindle housing at the lower end of the spindle housing and then flows upwardly between the spindle housing and the shaft to the upper end of the shaft. There, the oil is impelled outwardly by the washer. This forces the oil to recirculate downwardly through circulation channels and then up across the bearings. The grooved impeller washer thus serves as a pump for recirculating oil across the bearing surfaces in the spindle assembly. The output shaft seal of the hydraulic motor is removed in this embodiment, so the spindle assembly is lubricated by motor fluid.

The spindle assembly is formed of aluminum, preferably an aluminum alloy such as the 850 series or 356 series. Other materials having comparable characteristics and which could serve as a plain bearing material with the spindle material employed could be used. The bore in the spindle assembly is designed to fit relatively closely to the spindle, so that the spindle housing more effectively resists side loads and unbalanced loads to which the spindle may be subjected. A diametral clearance of approximately 0.001 inch is desirable. A clearance of 0.0005 to 0.002 inches is satisfactory. More tolerance is permissible if bearing inserts are used.

Upward and downward axial thrust loads are resisted by the impeller and thrust washer acting against the bottom of the spindle housing pilot bore and the face of the motor pilot. The coupling between the spindle and the motor output shaft allows sufficient axial movement of the washer to permit the washer to resist thrust loads.

In another aspect of the invention, case drain oil pressure is used to circulate oil through the spindle assembly. The invention also contemplates that the hydraulic motor output shaft can remain sealed and a separate reservoir can be employed to provide lubricant for the spindle assembly. The separate reservoir can be incorporated in the motor or be separate from the motor, or a separate lubrication block can be positioned between the motor and the spindle assembly. A fluid outlet between a pair of spaced motor output shaft seals can be used to provide a visible indication of motor oil seal failure.

With the foregoing spindle assembly, manufacturing costs are dramatically reduced, while the life and effectiveness of the spindle assembly are maintained. Expensive bearing inserts are eliminated, and expensive machining operations are eliminated. Also, virtually any brand of hydraulic motor that can be offered in DIN standard configuration can be fitted to this spindle assembly.

These and other advantages and features of the present invention are described in detail below and shown in the appended drawings.

BRIEF DESCRIPTION OF THE DRAWINGS

FIG. 5 is a side elevational view, shown partly in section, of the spindle housing of the present invention.

FIG. 6 is a plan view of the spindle housing of FIG. 5, showing a four bolt square flange.

FIG. 7 is a fragmentary sectional view of a lower edge of the spindle housing.

DETAILED DESCRIPTION OF THE PREFERRED EMBODIMENTS

Figure 1:
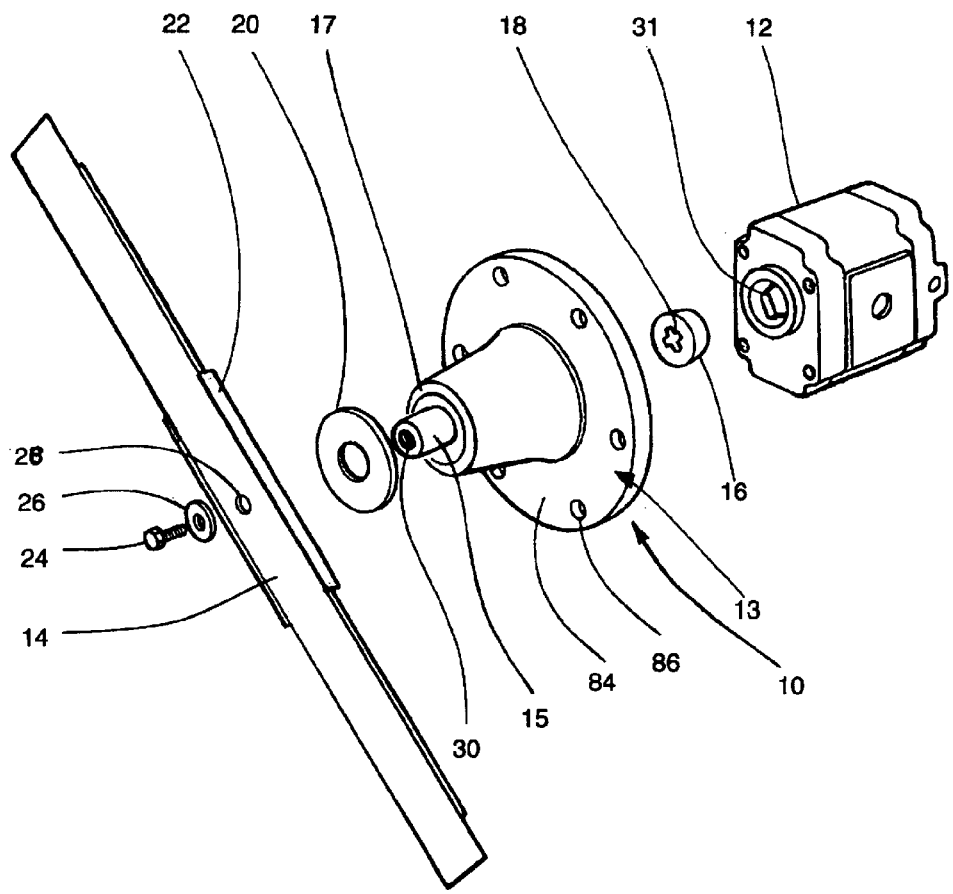
FIG. 1 is an exploded perspective view showing the spindle assembly of the present invention interposed between a hydraulic motor and blade assembly and employing a round flange.

Referring to the drawings, a spindle assembly 10 constructed in accordance with the present invention is shown interposed between a conventional hydraulic motor 12 and a conventional blade 14 for a rotary law mower. Spindle assembly 10 comprises a spindle housing 13 and a spindle 15 rotatably mounted in the housing. A coupling 16 having a plus-shaped opening 18 fits on flattened ends (tangs) 31 and 33 of the motor output shaft and the upper end of spindle 15 to non-rotatably join them together while still permitting some axial and radial movement of one with respect to the other. A grass, dirt, and debris excluder cap 20 fits on the lower end 17 of the spindle assembly. Blade assembly 14 is held in position by a bracket 22, and a bolt 24 extending through a washer 26 and an opening 28 in blade 14 attaches the blade assembly to the spindle by threaded movement of the bolt into threaded opening 30 in the lower end of spindle 15. The excluder cap is clamped between the blade assembly and the spindle shoulder.

Figure 2:
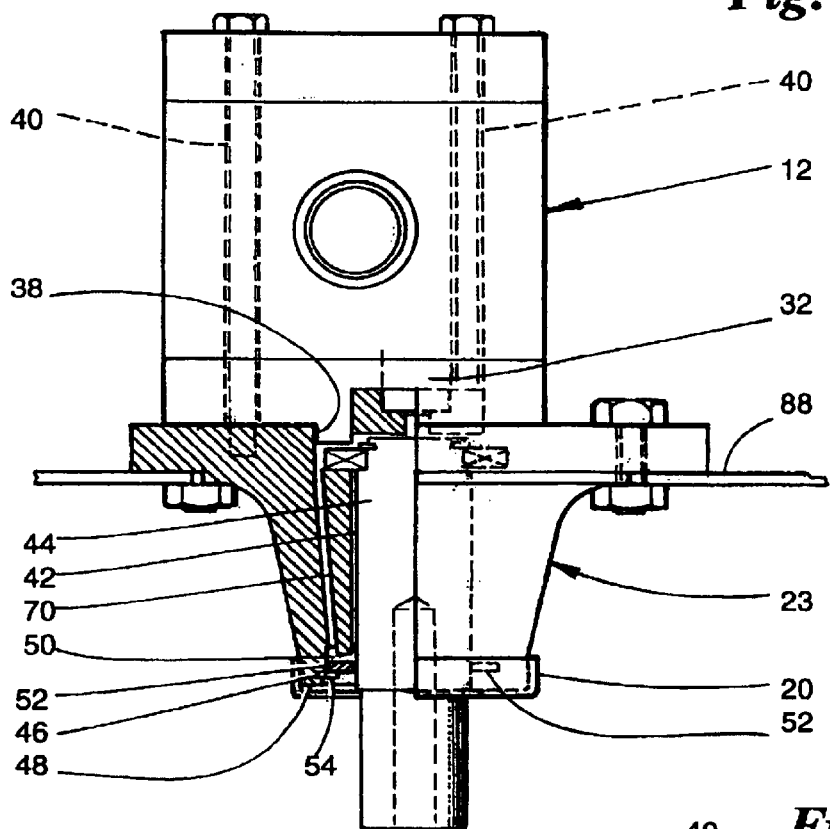
FIG. 2 is a side elevational view of the motor and spindle assembly of the present invention, shown partially in section and employing a square flange.

Referring to FIG. 2, motor 12 is a conventional hydraulic motor having output shaft 32 extending vertically downwardly from the motor. In the embodiment of FIGS. 1–15, motor 12 is conventional except for the fact that the output shaft oil seal is removed. This permits hydraulic fluid to leak out of the hydraulic motor at the output shaft and infiltrate the interior of the spindle housing to lubricate the surfaces between the spindle and the spindle housing.

Figure 3:
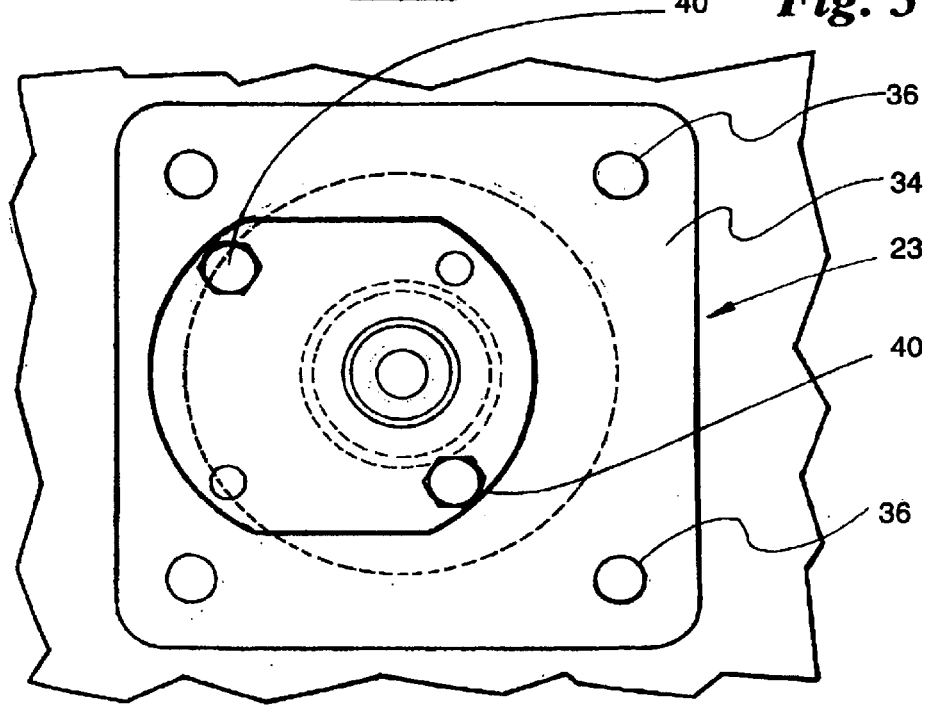
FIG. 3 is a top plan view of the motor and spindle assembly of FIG. 2.
Figure 4:
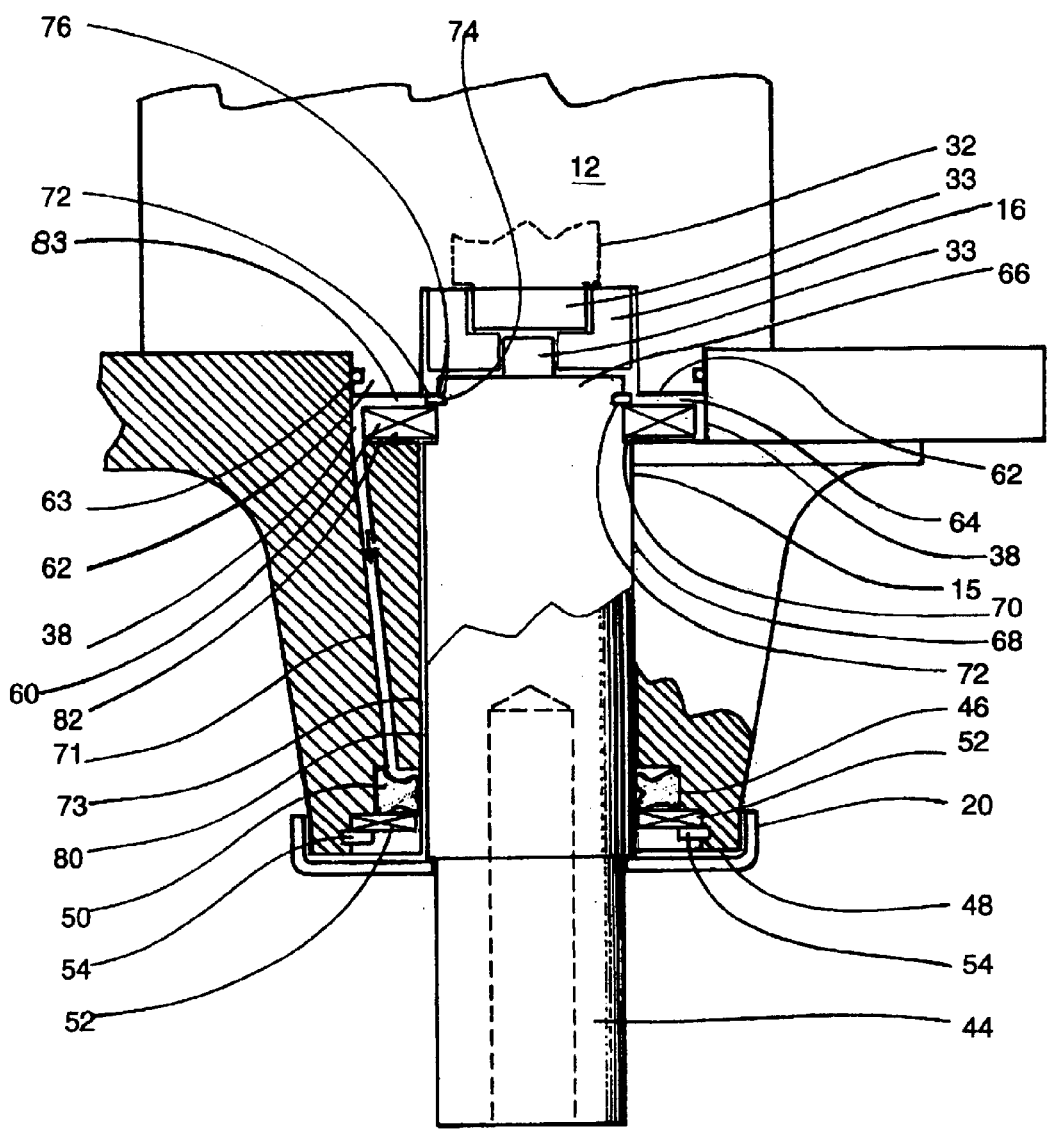
FIG. 4 is an enlarged partially sectional fragmentary view of the motor and spindle assembly of FIG. 2, showing the manner in which the spindle is mounted in the spindle housing.

In FIGS. 2 and 3, the spindle assembly employs a housing 23 that is substantially the same as housing 13 in FIG. 1, with the exception that housing 13 has a round flange 84, whereas housing 23 has an exterior flange 34 that is rectangular or square in shape, with holes 36 formed at the corners of the flange. The shape of the flange is selected depending upon the particular application. Aside from the differences in the flange configuration, the spindle housings 13 and 23 are functionally the same.

Hydraulic motor 12 is fastened by bolts 40 to the upper surface of flange 34 with at least two diametrically opposed bolts.

Spindle housing 23 comprises an enlarged recessed opening or pilot bore 38 in an upper surface that receives a motor pilot and output shaft of hydraulic motor 12. Spindle housing 23 also has a smaller diameter bore 42 that extends all the way through the center of the main portion of the housing, which receives spindle 44. Desirably, the clearance between the spindle and interior surface of the bore 42 is fairly close, in order to provide maximum support for the spindle and prevent unbalanced loads from causing accelerated wear to the spindle housing. As shown, the spindle 44 rides directly on the surface of bore 42 without any intermediary bushing or bearing lining. This saves considerable expense and yet works well therein. The interior surface of the bore is thus a plain bearing. An intermediate portion 45 of the spindle (FIG. 11) can be recessed to limit the length of the bearing surface. This can facilitate oil flow and reduce the friction surface.

To provide a good plain bearing surface for the steel spindle, the spindle housing of the present invention is formed of a material that is somewhat softer than the steel rod from which the spindle is formed. This material preferably is an aluminum alloy, such as the 356 or 852 series of aluminum alloys or a suitably reinforced plastic, or equivalent. Spindle housing 23 includes an enlarged opening 46 extending upwardly from a lower end 48. A seal 50 fits in the enlarged opening and a retainer washer 52 fits on the underside of the seal. The clearance between the washer 52 and the spindle is minimized in order to prevent dirt from damaging the seal. A snap ring or circlip 54 in fitted a groove 56 immediately below retainer washer 52 holds the retainer washer in place in the spindle housing.

To provide a desirable bearing surface, the spindle and spindle housing bore are finished smoothly, preferably to a finish of about 10 microinches or better.

Figure 14:
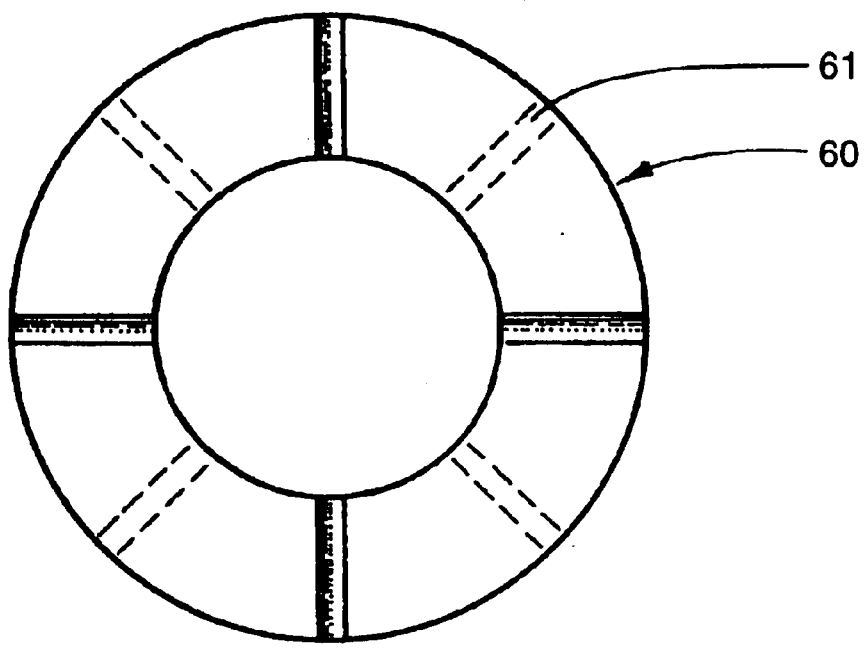
FIG. 14 is a top plan view of a grooved impeller and thrust washer of the present invention.
Figure 15:
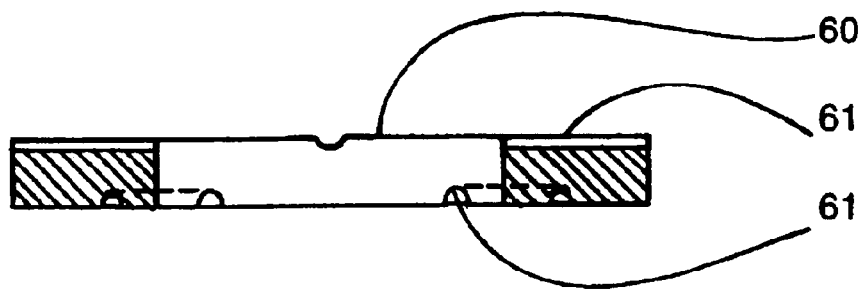
FIG. 15 is a cross-sectional side view of the impeller and thrust washer of FIG. 14.
Figure 16:
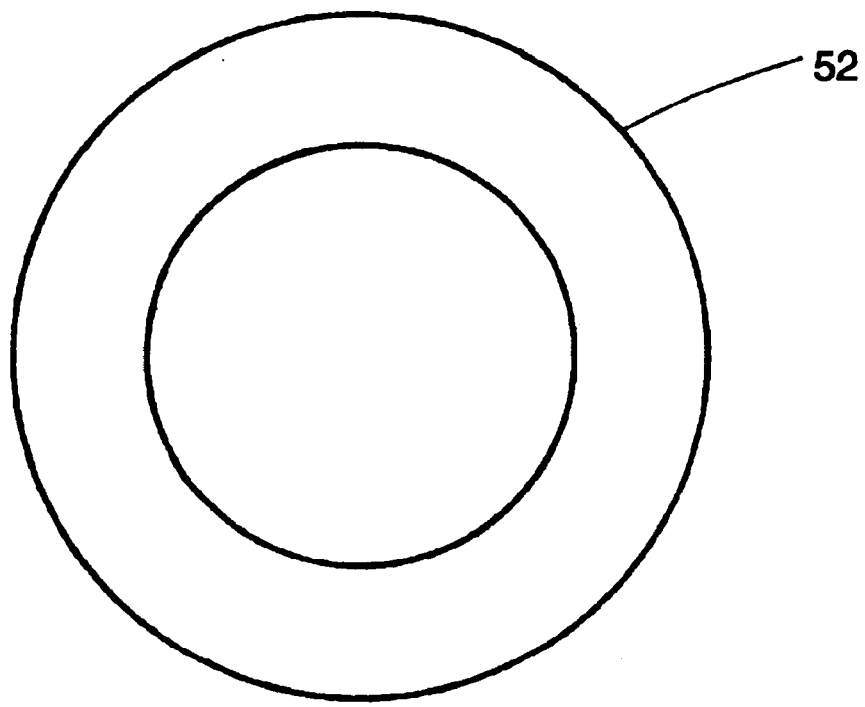
FIG. 16 is a plan view of the outer seal retainer washer of the present invention.
Figure 17:
FIG. 17 is an edge view of the seal retainer washer of FIG. 16.
Figure 18:
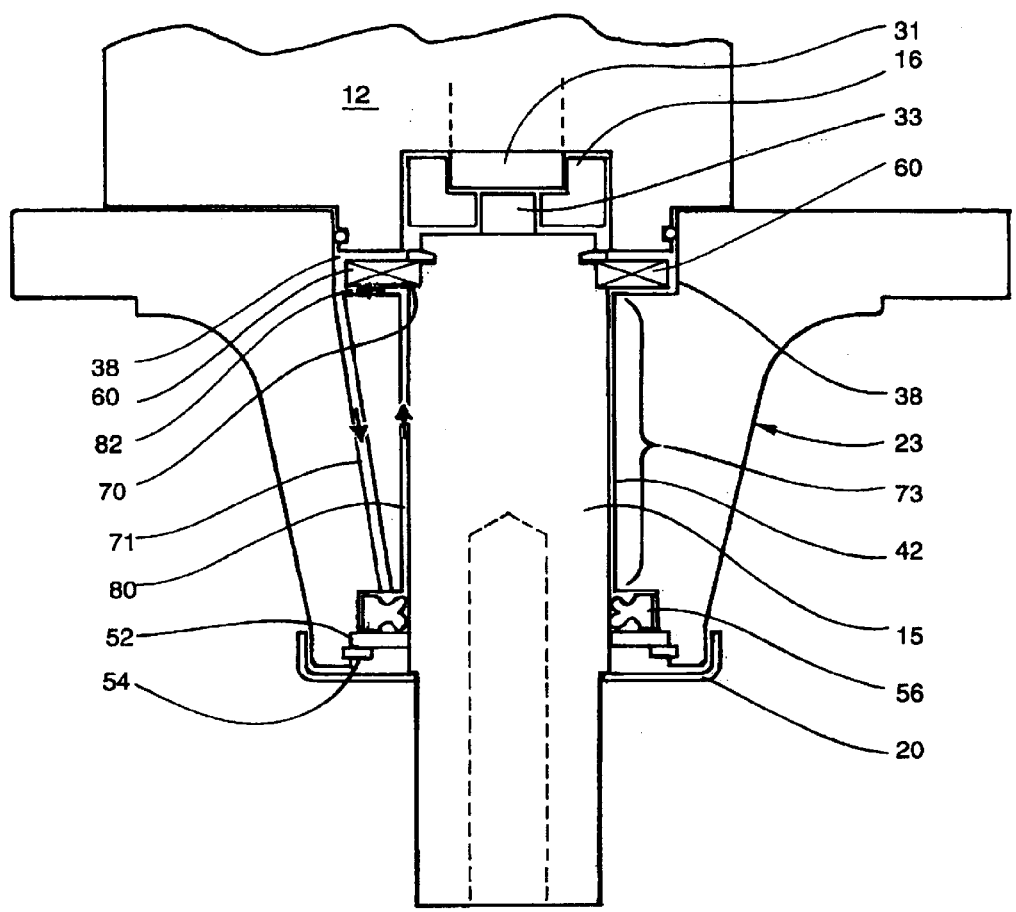
FIG. 18 is a fragmentary sectional side elevational view of the spindle assembly of the present invention, shown with the motor mounted on the spindle assembly.

At the upper end of the spindle housing (FIG. 4), thrust and impeller washer 60 is spaced away from a pilot projection 62 on the lower end of hydraulic motor 12. Pilot 62 fits in pilot bore 38 and aligns motor output shaft 32 with the spindle. Seals 63 seal the pilot in the pilot bore. Washer 60, which is shown in detail in FIGS. 14 and 15, is a hardened, flat steel washer desirably having radial grooves 61 spaced around the periphery of at least a lower side of the washer. The grooves desirably are spaced alternatively around both sides of the washer. Washer 60 fits on an upper portion 66 of spindle 15 that has a reduced diameter relative to the central portion 68 of the spindle. The washer rests on a shoulder 70 forming the junction between portion 66 and portion 68 of the spindle. A tapered snap ring (also referred to as a circlip) 72 fits in a tapered groove 74 having a downwardly and inwardly tapered upper edge 76 in order to tightly clamp impeller washer on the end of spindle 15. The tapered groove 74 urges the circlip downwardly into a clamping relationship with washer 60, thus serving to hold the washer tightly in place while not requiring extra close tolerances between the parts in order to ensure a tight fit.

Spindle housing 23 includes one or more downwardly and inwardly inclined fluid channels or oil holes 71 extending from a position adjacent the outer periphery of recess 38 and extending downwardly and inwardly to recess 46. The lower end of hole 71 is in communication with the spindle at a position above seal 50 and below the portion 73 of the spindle housing that serves as the plain bearing for the spindle.

The function of the grooved impeller washer can be described as follows: when the hydraulic motor and spindle assembly are operated, hydraulic fluid from the motor passes into the spindle housing from the hydraulic motor around the periphery of the output shaft of the motor. The hydraulic fluid flows over the end of the spindle and downwardly toward the outer edges of the spindle, where it comes in contact with the rapidly rotating impeller washer, which impels oil to flow radially outwardly toward the outer edge of recess 38. The oil then flows downwardly through channel 71 to the lower end of the channel. The oil then flows upwardly through the space 80 between the bore in the spindle housing and the spindle. When the oil reaches the top of the spindle housing, the rotating grooved impeller washer will cause it to be impelled to the outside, where it will again be recirculated. The grooves on the impeller washer not only facilitate lubrication but they also augment the outward movement of the oil from the space 82 between the upper end of the spindle housing and the lower surface of the impeller washer and space 83 between the upper surface of the impeller washer and the pilot 62 on the motor. Also, the radial grooves in the washer could be spiral shaped for impelling oil flow in only one motor direction.

Upward thrust loads are resisted by direct engagement between the washer 60 and pilot 62 (the end of which is machined flat). Downward thrust loads are resisted by engagement between the thrust washer 60 and bottom 82 of the pilot bore 38.

Figure 8:
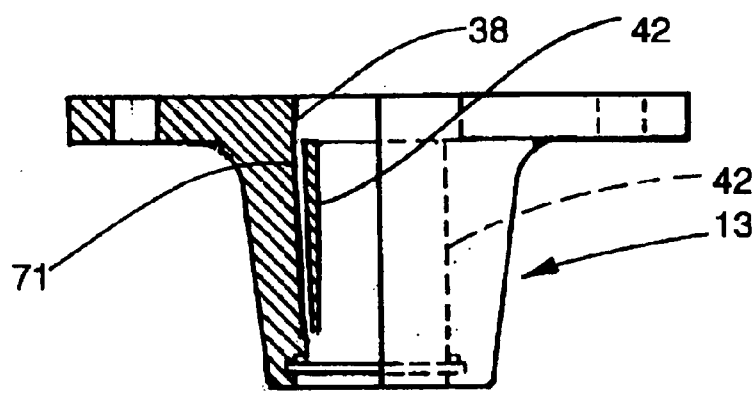
FIG. 8 is a side elevational view, shown partly in section, of the spindle housing of the present invention, employing a circular mounting flange.
Figure 9:
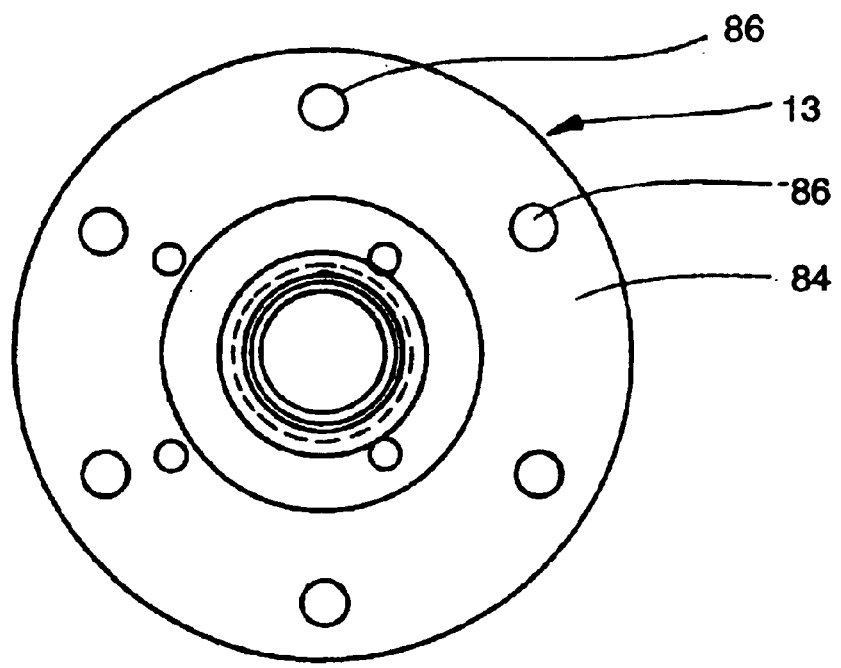
FIG. 9 is a bottom plan view of the spindle housing of FIG. 8.
Figure 10:
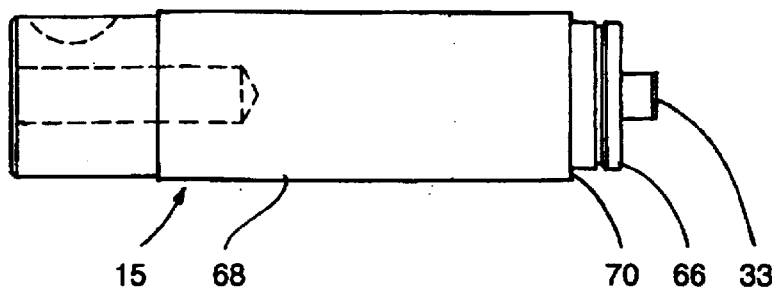
FIG. 10 is a side view of the spindle of the present invention.
Figure 12:
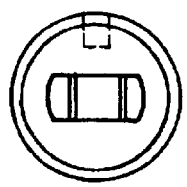
FIG. 12 is a top view of the spindle of FIG. 10.
Figure 11:
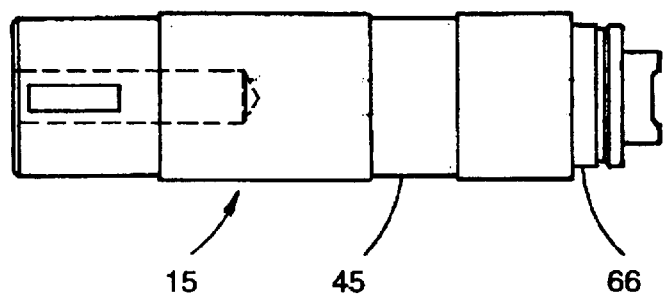
FIG. 11 is a side view of a modification of the spindle of FIG. 10, shown rotated 90° from the position of FIG. 10.
Figure 13:
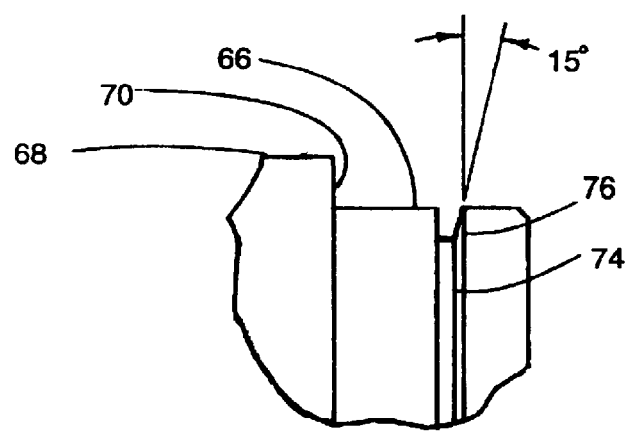
FIG. 13 is a fragmentary view of the edge of the upper end of the spindle of FIG. 10.

As shown in FIGS. 1, 8 and 9, certain applications require a spindle housing 13 with a round flange 84. Round flange 84 typically is provided with 6 holes 86 spaced around the periphery. In either case, the flange can be bolted downwardly from the top of the deck 88 (FIG. 2) or upwardly from the bottom of the deck of the rotary motor.

Figures 19, 19A:
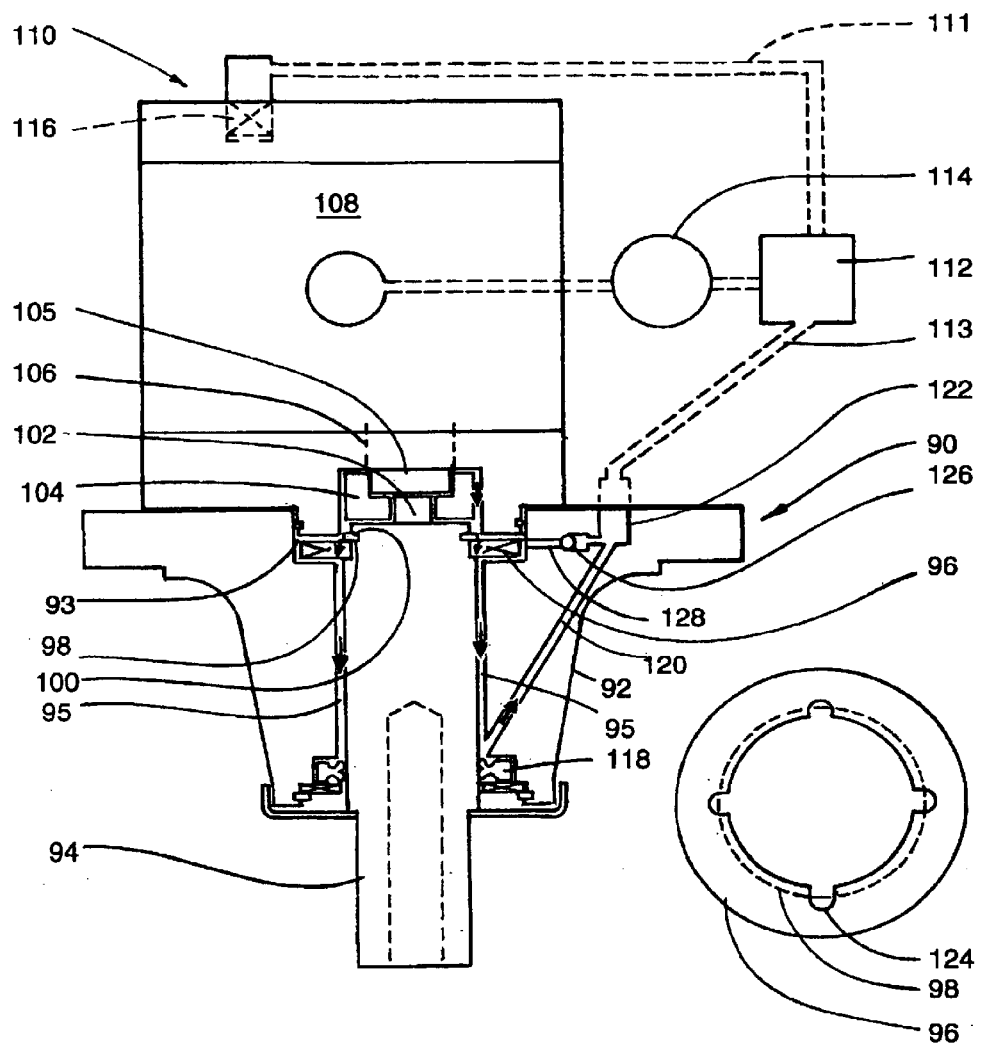
FIG. 19 is a sectional side elevational view of a second embodiment of the spindle assembly of the present invention, shown with a hydraulic motor mounted thereon.
FIG. 19a is a plan view of a modified thrust or impeller washer employed in the embodiment of FIG. 19.

A second embodiment of a spindle assembly 90 constructed in accordance with the present invention is shown in FIG. 19. Spindle assembly 90 includes a spindle housing 92 formed of aluminum and a spindle 94 formed of conventional rod or bar stock steel, both as described above. A thrust or impeller washer 96 is mounted securely on an upper end of the spindle by a tapered snap ring or circlip 98 that fits in a tapered groove 100, as described above. The spindle has a tang 102 at an upper end that engages a coupling 104 that connects the spindle with a tang 105 on the output shaft 106 of the hydraulic motor 108.

In a conventional hydraulic motor, there is a certain amount of leakage of hydraulic fluid past the internal motor seals. This hydraulic fluid collects in the casing, and the continuous leakage of this oil causes the oil to gradually increase in pressure. In a conventional hydraulic motor, the pressure is relieved by a case drain 110 that conveys oil in the casing to the main system reservoir 112 (shown schematically in FIG. 19). The oil is stored in the reservoir and ultimately fed back to the motor by the main system pump 114. The embodiment of FIG. 19 employs case drain pressure as a means for circulating oil through the spindle assembly.

Rather than permit the pressurized casing oil to pass into the reservoir through conduit 111 from case drain 110, the case drain 110 is blocked by plug 116. In this embodiment, the shaft seal on the hydraulic motor also is removed, as in the previous embodiment, so the case drain oil is forced along the shaft into pilot bore 93 in the spindle housing 92. Oil is forced by the case drain pressure downwardly into the spindle housing bore 95 between the spindle and the housing until the oil reaches oil seal 118. The oil then progresses upwardly in channel 120 to case drain port 122, where it flows upwardly through conduit 113 to the main system reservoir 112. Case drain pressure thus is utilized to provide continuous recirculation of oil through the spindle assembly. Since case drain pressure is used, washer 96 does not have to function as an impeller. While it is still desirable to employ grooves on the washer in order to provide oil channels for lubrication and oil flow, the oil grooves are not critical for impelling oil flow. In order to enhance oil flow in this embodiment, notches 124 are formed on the inner periphery of washer 96. These notches extend outwardly beyond the outer periphery of snap ring 98 so that the outer ends of the notches form oil flow channels through the washer and permit oil to flow more readily past the washer into the lower portion of the spindle assembly housing.

In order to avoid possible injury to spindle assembly seal 118 by excess case drain flow and pressure, a relief valve 126 may be as shown incorporated in a channel 128 extending from the outer periphery of washer 96 to drain port 122. Relief valve 126 is selected so that it permits oil to flow from the spindle housing directly to the drain port 122 before any oil pressure limitations of spindle assembly shaft seal 118 are exceeded. This prevents the case drain pressure from blowing out seal 118 and upsetting pressure balance in the motor.

Figure 20:
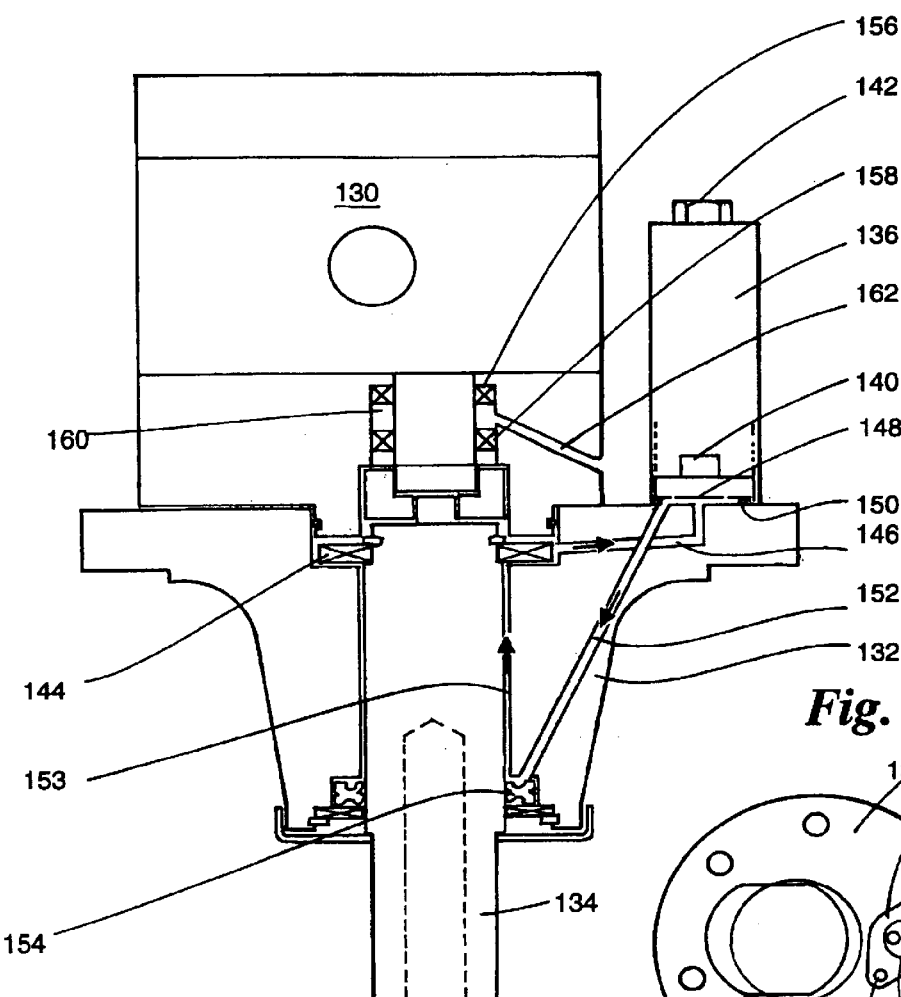
FIG. 20 is a sectional side elevational view of a third embodiment of the present invention.
Figure 21:
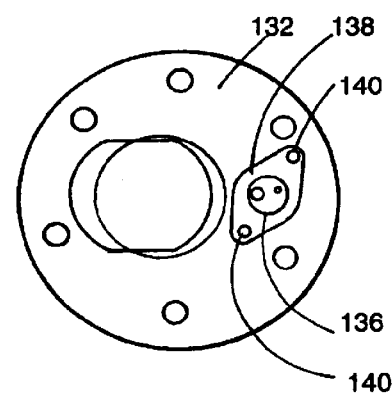
FIG. 21 is a plan view of the spindle assembly of the embodiment of FIG. 20.

A third embodiment of the present invention is shown in FIGS. 20 and 21. As in the previous embodiments, hydraulic motor 130 is mounted on spindle housing 132 to drive spindle 134. There are two significant differences in this embodiment. First, a separate reservoir 136 is mounted on the spindle assembly housing by means of a flange 138 or other suitable method. The flange is bolted to the upper surface of the spindle assembly housing by allen bolts 140. A bolt 142 in the top of the reservoir can be removed for adding additional fluid to the reservoir.

In the embodiment of FIG. 20, washer 144 serves as an impeller, as in the first embodiment. The impeller forces oil outwardly through conduit 146 into an opening 148 at the bottom of the reservoir. This opening is sealed by means of an o-ring seal 150. Liquid received in the reservoir is transmitted to conduit 152, which leads from the reservoir downwardly to the bottom of the spindle housing just above shaft seal 154. The pressure created by impeller 144 pumps the fluid under pressure downwardly through conduit 152 and then upwardly through space 153 between spindle 134 and spindle housing 132, where it is again impelled outwardly when it reaches impeller 144.

The circulation pattern of the fluid in this case is similar to the prior embodiments, but the oil for lubricating the spindle assembly is not received from the hydraulic motor but is instead received from its own source of supply in reservoir 136. The motor itself in this embodiment retains its shaft seal 156 and may employ a second shaft seal 158. In order to employ two shaft seals on the motor, it may be necessary to elongate the motor housing or employ a longer output shaft on the motor housing. The reason for two shaft seals spaced along output shaft 160 is to provide additional protection against oil leakage as a result of a defective or broken seal in the hydraulic motor. Since the hydraulic motor operates with a substantial supply of hydraulic fluid, if the hydraulic motor seal breaks the motor can conceivably pump a great deal of hydraulic fluid into the spindle assembly causing the spindle seal to fail, thus spraying pressurized oil onto the lawn being mowed.

To avoid this problem, the two output shaft seals are employed and a separate drain 162 is positioned between the seals and leading to an outlet at the side of the motor. This drain is positioned so that if seal 156 fails, hydraulic fluid is discharged out the side of the motor onto the top of the mower deck, where the oil will collect and be immediately visible to the mower operator. The mower can then be stopped and the damage repaired before any substantial leakage of hydraulic fluid onto the grass.

Figure 22:
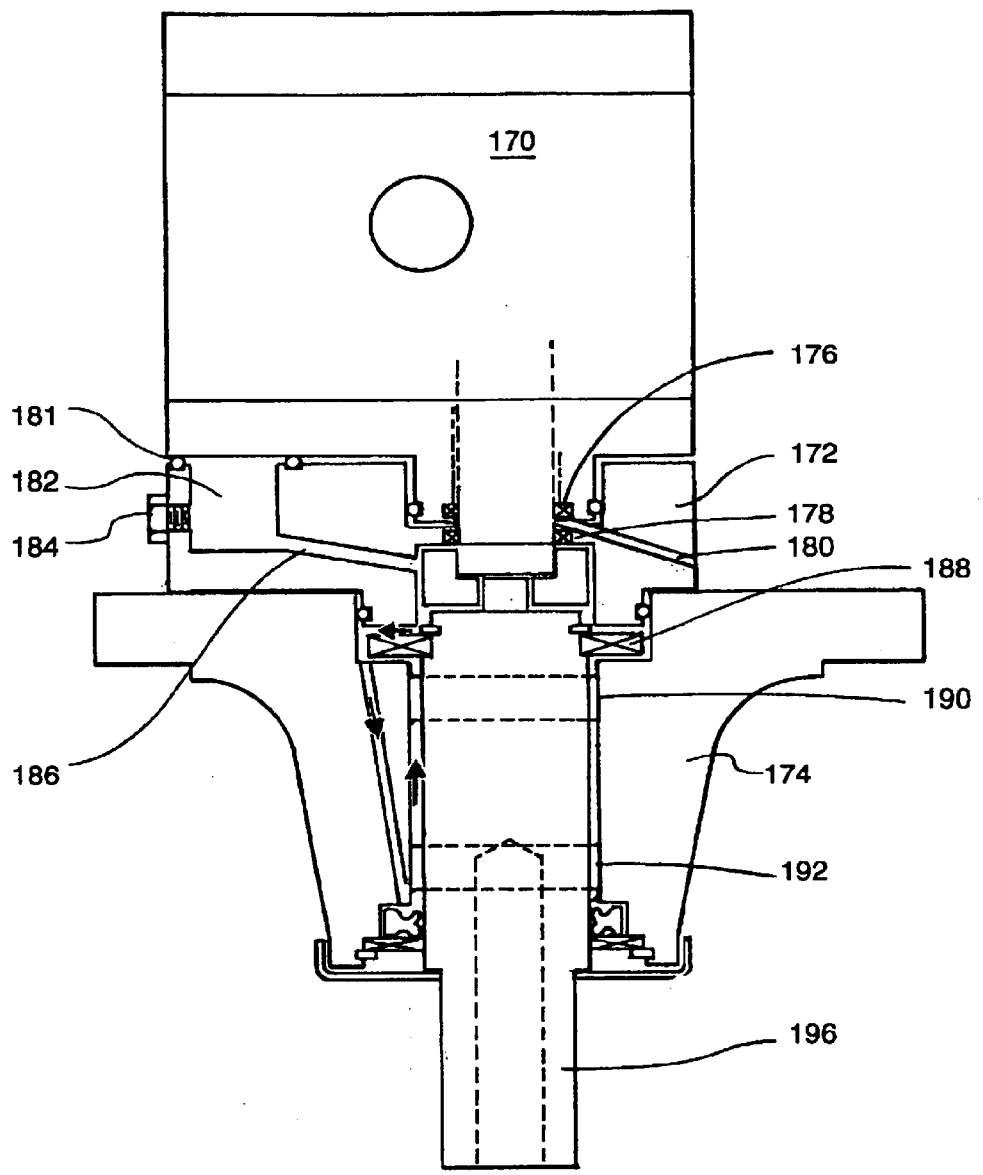
FIG. 22 is a sectional side elevational view of a fourth embodiment of the present invention, showing a lubrication block mounted between the motor and the spindle assembly and using sleeve bearing inserts to increase load capability.

Another means for providing lubrication to the spindle assembly without removing the shaft seal from the hydraulic motor is shown in a fourth embodiment of the invention in FIG. 22. In this embodiment, motor 170 is mounted on a lubrication block 172, and the lubrication block is mounted on spindle housing 174. A single shaft seal 176 is employed with the motor, so a conventional motor can be used. An additional shaft seal 178 is incorporated in lubrication block 172. A drain 180 is positioned between the two axially spaced shaft seals so that hydraulic fluid is discharged on the top of the mower deck if seal 176 fails.

Lubrication block 172 includes a reservoir 182 for lubricant for the spindle assembly. An open top of reservoir 182 is sealed against the motor face plate by a seal such as O-ring seal 181. A threaded bolt 184 provides access to the reservoir for replenishing oil from time to time, which may be as infrequently as once every 2000 hours of operation. A conduit 186 extends from reservoir 182 to the upper end of the spindle housing, where it discharges oil into the spindle housing. The oil is thereafter recirculated by impeller 188 in the manner described previously. The oil is continuously recirculated by the impeller.

A conventional motor 170 can be employed with this embodiment of the invention, with the exception that a longer motor output shaft is required so that the motor shaft can extend through the lubrication block.

Another aspect of the invention illustrated in FIG. 22 is the incorporation of auxiliary bearings 190 and 192. While an aluminum spindle housing can serve adequately as a bearing for a steel spindle 196, a unit capable of withstanding very heavy loads can desirably incorporate auxiliary bearing inserts 192 and 190.

If a bearing insert is used, it is desired that the bearing be a sleeve bearing insert that is press fit into the top and/or bottom of the bore in the spindle housing. The bearing can be approximately ¾ inch long. If a bearing is used, the bearing should at least be at the bottom of the spindle housing, in the event that the bearing is not used in both the top and bottom. Desirably, a Garlock DP 4 bearing or equivalent is employed. A DU bearing also can be used. A leaded bronze bearing with a steel backing also can be used and is less expensive. The bearing may employ a Teflon coating for improved slip characteristics. Other plain bearing inserts could be used.

Figure 23:
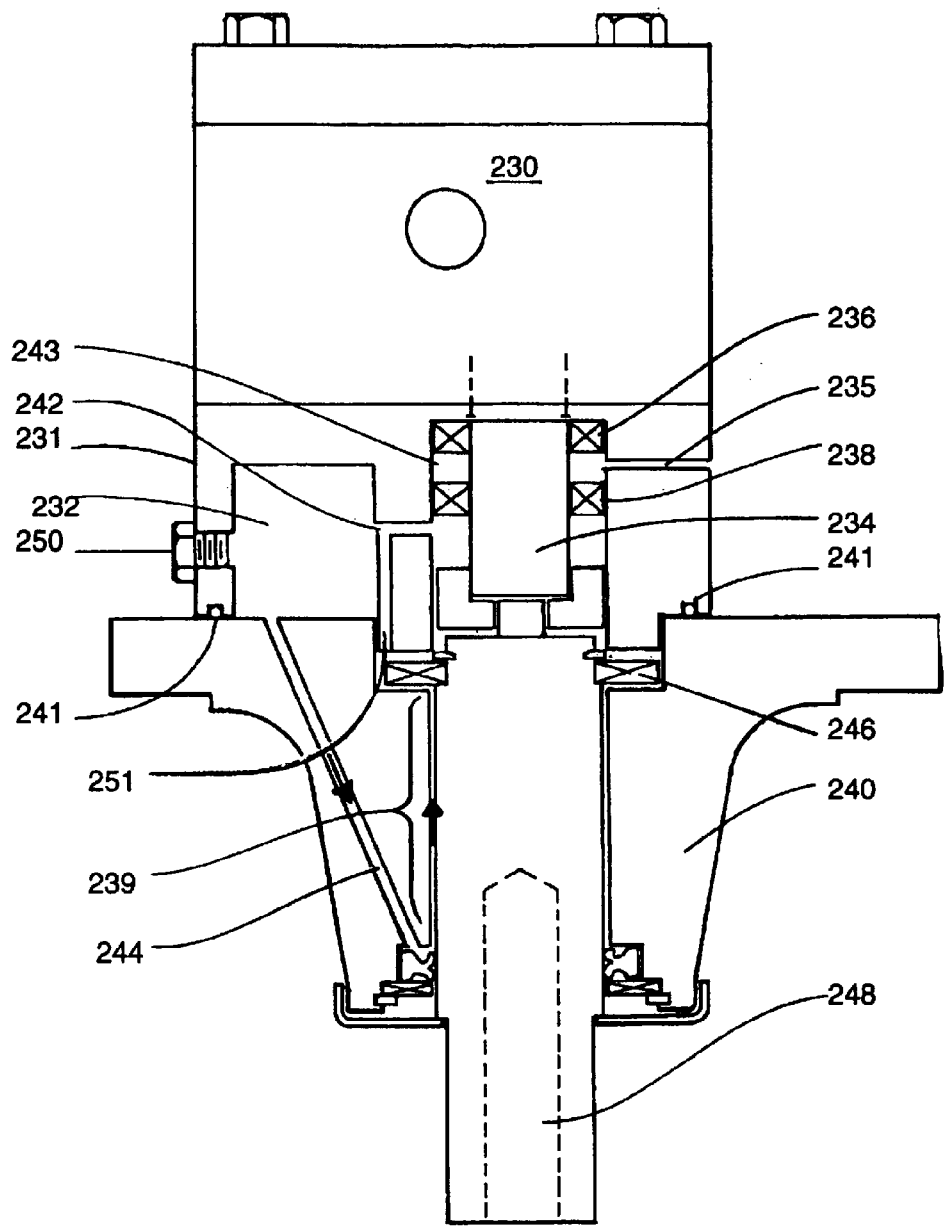
FIG. 23 is a fifth embodiment of the present invention, showing another embodiment of a motor incorporating a reservoir for lubricating the spindle assembly.

A fifth embodiment of the invention is shown in FIG. 23. In this embodiment, motor 230 does not employ a separate lubrication block but instead incorporates a separate lubrication reservoir 232 inside the motor cover 231. The motor employs an elongated pilot shaft 234 with spaced seals 236 and 238. A drain 235 is positioned between both shaft seals 236 and 238. The drain leads to the top of the deck so that if the seal fails, a failure will be readily noted. Reservoir 232 has a vent 242 extending to the opening 243 through which the drive shaft passes to insure that the coupling and drive tangs are flooded with oil when the lubrication reservoir is filled. A separate conduit 244 conveys oil from reservoir 232 downwardly to the bottom of the spindle housing 240. The oil then flows upwardly through bearing surface space 239 between the spindle and housing bore where it lubricates spindle 248 in the manner described above and returns to the reservoir through groove 251. Drain plug 250 can be removed for replenishing oil in reservoir 232. A suitable seal 241 is fitted between the motor face and the spindle housing 240 to prevent lube oil leakage to the atmosphere.

Washer 246 serves as an impeller in this embodiment and causes recirculation of oil through conduits 244 and 251 and over bearing surface space 239.

Figure 24:
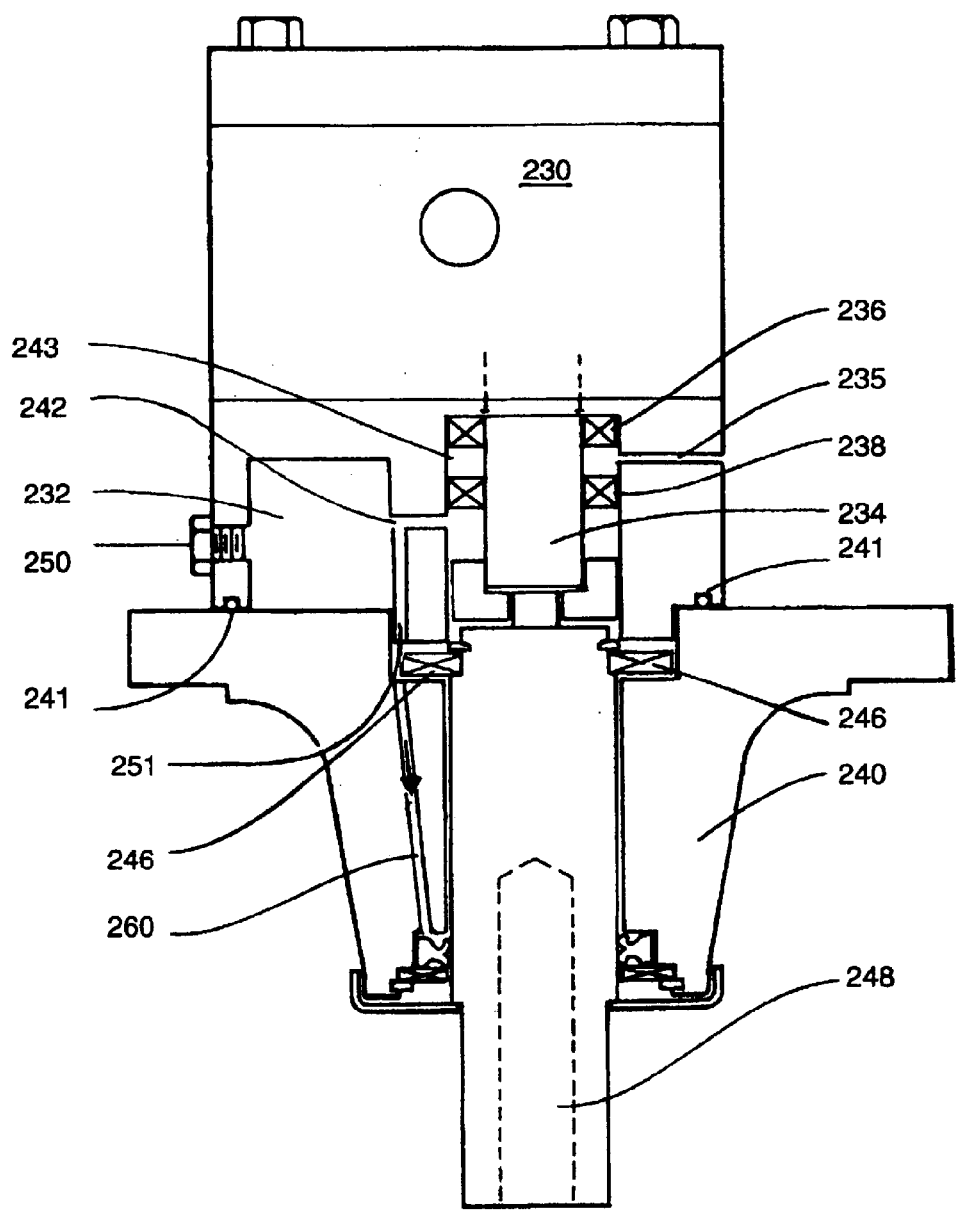
FIG. 24 is a sectional side elevational view of a sixth embodiment of the present invention.

A sixth embodiment of the invention is shown in FIG. 24. The embodiment is similar to the embodiment of FIG. 23, except that the motor front cover lubrication reservoir serves only to provide an oil source to the thrust washer area. Oil circulation occurs in the spindle body only through conduit 260 and the diametral clearance between the spindle and spindle bore. This embodiment can use the same spindle assembly as the embodiment of FIG. 2.

Figure 25:
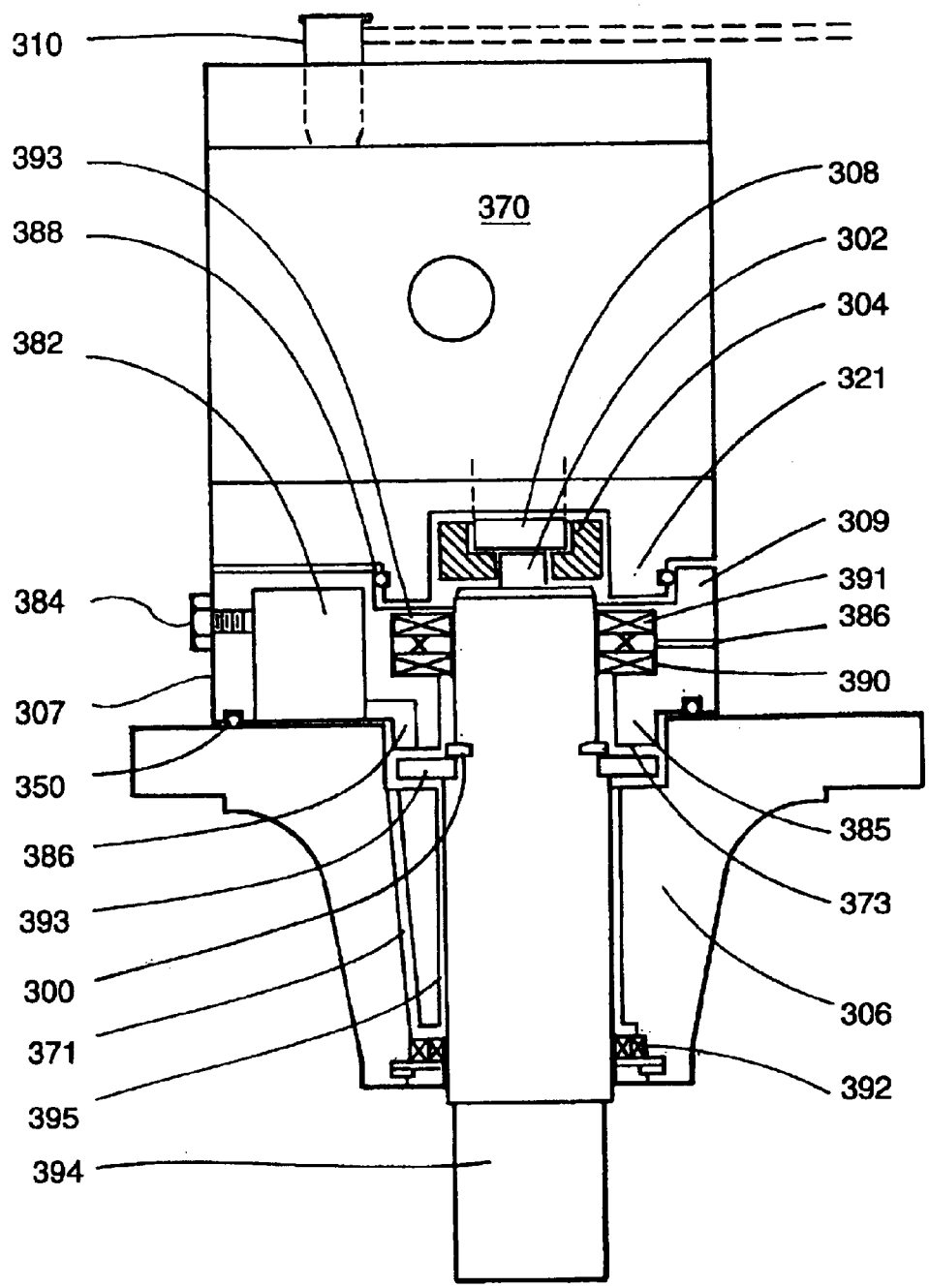
FIG. 25 is a sectional side elevational view of a seventh embodiment of the present invention.

A seventh embodiment is shown in FIG. 25. The motor 370 used for this embodiment is a catalog standard configuration. No shaft seal is fitted to the motor. Lubrication for the spindle tang 302, the shaft tang 308, and the coupling 304 is provided by oil from the motor. This is an advantage because contamination introduced by coupling wear is isolated from the oil that lubricates the spindle bearing. Internal motor oil leakage is returned to the system reservoir via a standard case drain port 310 on the motor.

The spindle assembly includes a spindle housing or body 306 that is the same as that used in FIGS. 2, 4, 18, and 24. A spindle 394 is mounted in a bore 395 in the housing. The spindle has an elongated portion above the snap ring 300 that extends through a spindle assembly top section or lubrication block 307 so that it enters coupling 304. The top section 307 is made of aluminum or other suitable material and has a female pilot bore 309 to locate pilot 321 of motor 370. A male pilot 385 on the lower end of top section 307 has a relief or groove 386 in its circumference to allow lube oil to pass from reservoir 382 to the oil recirculating system in spindle body 306. The motor is sealed in spindle top pilot 309 by an O-ring 388 fitted in a groove in motor pilot 321.

The spindle top section 307 includes lube oil reservoir 382, fill plug 384, a suitable seal 350 around the circumference of its bottom face to prevent lube oil leakage, two rotary shaft seals 390 and 391 (separated by a spacer 393), which seal internal motor leakage and the lube oil from moving axially along the upper elongated portion of spindle 394. Should either seal 390 or 391 fail, the vent 386 to atmosphere will prevent co-mingling of the system oil and the lube oil by allowing the leakage to flow onto the deck top where it will be readily apparent to the operator that there is a problem. The face 373 of the spindle top section 307 male pilot 385 is suitably machined to be a thrust surface for the impeller washer 393 which is held against the upper spindle shoulder by tapered snap ring 300, as discussed above. Internal spindle lubrication flow is as previously described for embodiment seven (FIG. 24).

The advantage of providing independent lubrication for the spindle is that only a small amount of oil is necessary to lubricate the spindle, so that an oil spill will not be damaging. The use of a lubrication block or top section as in FIG. 25 makes it possible to employ a conventional motor without an elongated output shaft. The incorporation of the reservoir in the motor cover itself should result in a less expensive assembly. On the other hand, removal of the shaft seal from the motor and recirculating hydraulic fluid through the spindle housing either by the impeller washer or by case drain pressure (as in other embodiments) is the simplest and least expensive method for lubricating the spindle assembly.

Figure 26:
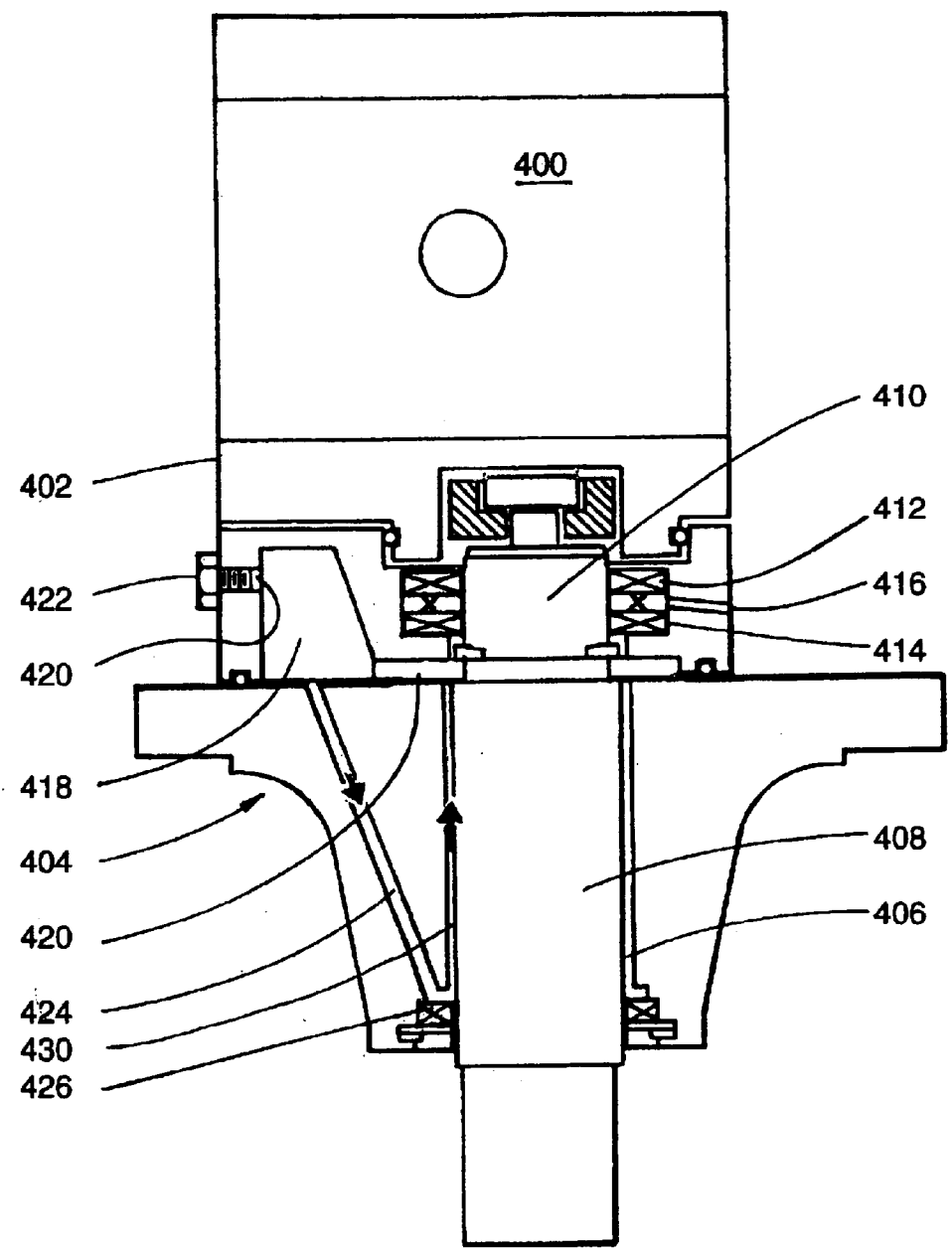
FIG. 26 is a side elevational view of a eighth embodiment of the present invention.

An eighth embodiment of the present invention is shown in FIG. 26. A conventional hydraulic motor 400 is mounted on a reservoir block 402, which is positioned between the motor and spindle housing 404. Opening 406 in spindle housing 404 accommodates spindle 408. An upper portion 410 of the spindle extends into reservoir block 402. A pair of shaft seals 412 and 414 are positioned on opposite sides of a leakage port 416 which leads to the top of the mower deck, as described in previous embodiments. Reservoir 418 with inlet 420 covered by bolt 422 stores lubrication for the spindle. Conduit 424 through the spindle housing 404 extends from reservoir 418 to the lower end of the housing. A shaft seal 426 is positioned at the bottom of the spindle bearing area. A thrust washer or impeller 428 which impels lubrication outwardly is positioned at the top of the spindle bearing area. The space 430 between the spindle and the housing provides an upward channel for lubrication. Lubrication circulates from the reservoir downwardly through channel 424 and then upwardly through channel 430 and then is impelled outwardly back into the reservoir by impeller 428.

Figure 27:
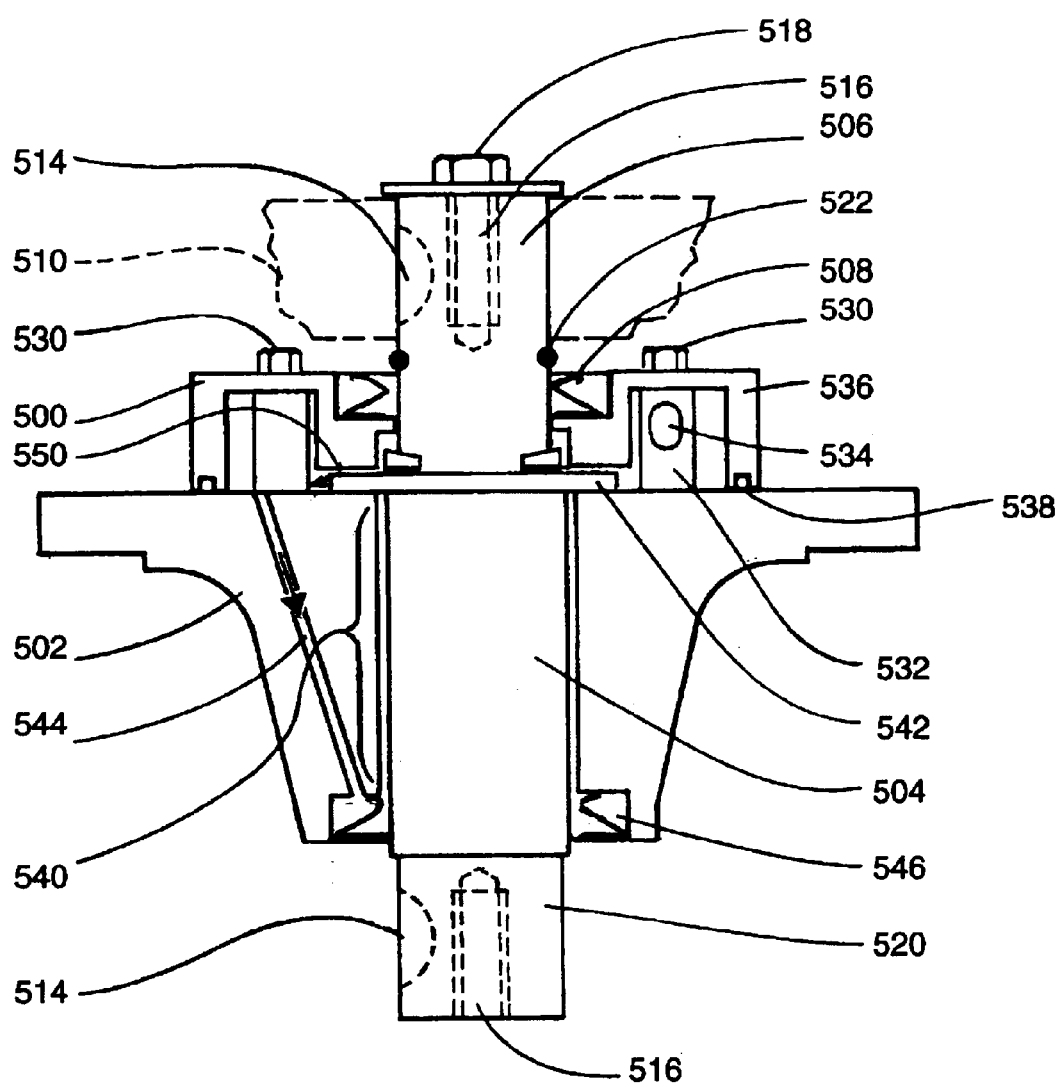
FIG. 27 is a side elevational view of a spindle assembly of a ninth embodiment of the present invention.

A ninth embodiment of the invention is shown in FIG. 27. In this embodiment, a lubrication oil reservoir 500 made of aluminum, plastic or other suitable material has been fitted to spindle housing 502, and the spindle 504 has been elongated to extend through the reservoir. The elongated portion 506 of the shaft passes through a shaft seal 508 in the reservoir and is configured to mount a pulley or sprocket 510 on upper end 506, so that the spindle assembly can be driven mechanically by a belt, chain, or the like from an adjacent power source, which can be a hydraulic motor, internal combustion engine or other power source. A keyway 514 is used to non-rotatably mount the pulley or sprocket on the shaft, and a threaded opening 516 accommodates a bolt 518 to lock the sprocket or pulley on the shaft. The lower end 520 of the shaft also includes a keyway 514 and a threaded hole 516 for a bolt to hold the blade on the bottom of the shaft. A wire ring 522 fits in a groove in the shaft to provide a stop for downward movement of the pulley or sprocket.

The oil reservoir is mounted on the spindle housing by bolts 530 which extend through sleeves 532, at least one of which has an opening 534 for oil. The bolts and sleeves extend through an oil chamber 536 which is sealed by O-rings 538. Oil is introduced into the oil chamber by removing bolts 530 and adding oil through the bolt holes and the sleeves. The oil passes through opening 534 into the oil chamber.

Oil is circulated through the spindle bearing surface 540 by thrust washer 542 in the manner described above. Oil from the thrust washer is impelled into the oil chamber and then down through channel 544 to the lower end of the spindle bearing, whereupon the oil is forced upwardly along bearing surface 540 between the spindle and the housing to thrust bearing 542, which causes it to continue circulating. The shaft seal 546 at the lower end of the housing seals the lower end of the housing. The spindle bearing areas are the same as in previous embodiments. Upward thrust loads are resisted by the grooved thrust washer 542 in contact with a bearing surface 550 provided by the reservoir. Downward thrust is resisted by engagement of the thrust washer with the top face of the spindle body.

It should be understood that the foregoing is merely representative of the preferred practice of the present invention and that various changes and modifications may be made in the arrangements and details of construction disclosed herein without departing from the spirit and scope of the present invention.

I claim:

1. A spindle assembly for a rotary lawnmower wherein a horizontal mower blade is driven by a hydraulic motor by means of a spindle assembly interconnecting the mower blade with an output shaft of the motor, the spindle assembly comprising:

a spindle housing, the spindle housing including an axial bore therethrough and mounting means for mounting the spindle housing adjacent a motor in a rotary mower with the bore in axial alignment with the output shaft of the motor, the bore having a first diameter in a main portion of the housing, the bore having a recessed enlarged opening of a larger second diameter at an upper end of the housing;

a spindle rotatably mounted in the bore in the spindle housing, the spindle comprising an elongated round rod having a main portion that fits closely in the main portion of the bore, the rod having an upper portion of reduced diameter at an upper end, forming a shoulder between the upper and main portions of the rod;

a coupling drivingly interconnecting an upper end of the spindle with an outer end of the motor output shaft, the coupling permitting at least limited axial movement between the spindle and motor output shaft;

a washer having an outer diameter that is greater than the outer diameter of the main portion of the rod, but is small enough that the washer fits into the enlarged opening through an open upper end of the housing, the washer having an inner diameter greater than the upper portion of the rod but smaller than the diameter of the main portion of the rod, such that the washer fits over the upper portion of the rod and rests on the shoulder, the washer being releasably mounted on the upper end of the rod by a releasable fastener, the washer being positioned opposite a pilot on the motor when the spindle assembly is mounted along with the motor in a rotary mower, the washer serving as a thrust washer between thrust surfaces on the spindle housing and the pilot of the motor.

2. A spindle assembly according to claim 1 wherein:

the washer is mounted on the spindle such that the washer is at least resiliently urged to rotate when the spindle rotates, the washer impelling lubrication fluid adjacent the washer to flow radially outwardly as the washer rotates in the fluid; and a fluid channel is formed in the spindle housing and extends from an inlet in communication with an outer periphery of the washer to an outlet in communication with the spindle at a lower end of the spindle housing, such that the washer acts as a pump and causes fluid to recirculate downwardly through the fluid channel, then upwardly over bearing surfaces between the spindle and the spindle housing bore, and back to the washer adjacent the inner periphery of the washer, the washer then causing the fluid to flow outwardly and recirculate through the same path, automatically providing fluid flow across bearing surfaces while minimizing lubricant breakdown caused by lack of lubrication circulation.

3. A spindle assembly according to claim 2 wherein the washer is resiliently held in place by a tapered snap ring fastener mechanism wherein a snap ring fits in a spindle groove, at least one of the snap ring and spindle groove having a tapered side wall that urges the snap ring to move axially toward the washer as the snap ring penetrates further into the groove, such that the washer can be held securely in the spindle without requiring extremely close tolerances in machining parts.

4. A spindle assembly according to claim 2 wherein the washer has a plurality of radially extending grooves in the upper and lower sides of the washer.

5. A spindle assembly according to claim 1 wherein a fluid flow path is provided between the hydraulic motor and the spindle assembly such that hydraulic fluid under some pressure from internal motor leakage is conveyed to one end of a spindle bearing surface positioned between the spindle and spindle housing, such that the hydraulic fluid travels over the bearing surface to a drain port at an opposite end of the spindle bearing surface leading to a hydraulic system reservoir, thus providing pressure lubrication for the spindle.

6. A spindle assembly according to claim 5 wherein the washer has at least one notch extending outwardly from the inner periphery of the washer, the notch extending outwardly beyond the fastener holding the washer on the spindle and the spindle shoulder, such that liquid flowing downwardly from the hydraulic motor into the spindle housing can flow along the spindle through the washer by way of the notch rather than having to flow over the outer periphery of the washer in order to reach the main portion of the spindle.

7. A spindle assembly according to claim 5 wherein a pressure relief valve is provided in the spindle housing to provide an alternate path to the reservoir for excessive motor leakage flow to the spindle assembly, so as to limit the maximum pressure build-up within the spindle assembly and against a bottom spindle rotary seal, thus reducing the possibility of seal failure and subsequent flow past the seal.

8. A spindle assembly according to claim 1 wherein the spindle comprises steel and the spindle assembly housing is formed of a metal comprising aluminum, and at least a portion of the surface of the housing surrounding the bore serves as a plain bearing.

9. A spindle assembly according to claim 1 wherein the spindle comprises steel and the spindle assembly housing comprises a material that is softer than steel and constitutes a suitable bearing material for use with a steel shaft, such that at least a portion of the wall of the bore in the spindle housing itself serves as a plain bearing.

10. A spindle assembly according to claim 9 wherein the diametral clearance between the spindle and the wall of the bore of the housing along the bearing surface is about 0.0005 to 0.002 inches.

11. A spindle assembly according to claim 1 wherein the spindle assembly includes at least one bearing insert between the housing bore wall and the spindle, the one bearing insert being adjacent a lower end of the bore in the spindle housing.

12. A spindle assembly according to claim 11 wherein the spindle assembly includes bearing inserts at upper and lower ends of the bore in the spindle housing.

13. A spindle assembly according to claim 1 wherein the spindle assembly is lubricated by hydraulic fluid from the hydraulic motor, the hydraulic motor being sealingly joined to the spindle assembly around the hydraulic motor pilot and the hydraulic motor having no output shaft seal, such that hydraulic fluid can flow from the motor into the spindle housing through the enlarged opening in the upper end.

14. A spindle assembly according to claim 1 wherein the hydraulic motor comprises two axially spaced output shaft seals and the hydraulic motor includes a fluid channel leading from an inlet in communication with the output shaft at an axial position between the seals to an outlet positioned to dump fluid on the top of a deck of the rotary lawnmower if the upper seal fails, such that oil leakage is readily and visibly indicated if the upper output shaft seal fails.

15. A spindle assembly according to claim 1 wherein the washer has a plurality of radially extending grooves in a lower side thereof so as to impel or pump liquid from the inner periphery to the outer periphery of the washer as the washer rotates.

16. A spindle assembly according to claim 1 wherein the spindle is attached by releasable fasteners to a hydraulic motor with a pilot projection on the motor fitting in the enlarged opening in the upper end of the spindle housing, the pilot projection having a flat outer end, the pilot projection being positioned adjacent the washer when the spindle assembly is attached to a motor, the washer serving as a thrust washer between the motor pilot projection and the shoulder on the spindle.

17. A spindle assembly according to claim 16 wherein the washer includes radial grooves on one or more surfaces thereof.

18. A spindle assembly according to claim 17 wherein the radial grooves are formed in the underside of the washer.

19. A spindle assembly according to claim 16 wherein radial or spiral grooves are formed in the bottom of the pilot bore.

20. A spindle assembly according to claim 1 wherein the motor does not have a fully effective output shaft seal, such that hydraulic fluid is provided from the motor output shaft to one end of the spindle, the spindle assembly further including a conduit from an opposite end of the spindle to a case drain port of the spindle housing, the drain port leading to a system reservoir and system pump that stores and recirculates fluid back to the hydraulic motor system, motor case drain pressure serving to cause oil flow over bearing surface in the spindle housing and then back to the hydraulic motor.

21. A spindle assembly according to claim 1 and further comprising a reservoir for storing sufficient oil to lubricate the spindle assembly, a conduit leading from an inlet adjacent the outer periphery of the washer to the reservoir, and a conduit leading from the reservoir to an end of the spindle opposite to the end on which the washer is mounted, such that the washer causes oil to recirculate from the washer to the reservoir, then to the opposite end of the spindle, then along the bearing surface in between the spindle and spindle housing, and then back to the reservoir.

22. A spindle assembly according to claim 21 wherein the reservoir is separate from the motor and is mounted on the spindle housing.

23. A spindle assembly according to claim 1 wherein the spindle assembly secures lubricating oil for the spindle bearing from a discrete reservoir integral to the drive motor, the drive motor including at least one shaft seal to isolate the spindle lubricant from the hydraulic system fluid.

24. A spindle assembly according to claim 23 in which the one or more shaft seals isolating the spindle lubricant from the hydraulic system fluid are on an elongated spindle and not on the hydraulic motor output shaft.

25. A spindle assembly according to claim 23 wherein the spindle lubricant reservoir is incorporated in a lubrication block that is mounted between the motor and the spindle assembly, with a motor output shaft extending in an opening through the lubrication block.

26. In a hydraulic drive system for a rotary mower comprising a plurality of hydraulic motors, one for each of a plurality of rotary blades, a spindle assembly interconnecting an output shaft of each hydraulic motor with a rotary blade, a fluid flow loop connecting the motors in series, a pump for driving the motors by recirculating hydraulic fluid through the motors via the fluid flow loop, a reservoir in the fluid flow loop for storing reserve hydraulic fluid, each motor having internal fluid leakage that results in fluid pressure in the motor casing and the motor having a case drain port for conveying such fluid back to the reservoir to relieve the pressure in the casing, the improvement wherein:

the case drain port is blocked; and the spindle assembly includes a spindle mounted in a spindle housing, the spindle housing having a bore therethrough, at least a portion of the bore, with or without a bearing insert, serving as a plain bearing surface for the spindle, the spindle housing including a fluid flow path that extends from an inlet in communication with pressurized fluid in the motor casing, across the bearing surface in the spindle housing, and then to the reservoir for the hydraulic system, such that case drain pressure produces lubrication fluid flow across the bearing surface.

27. A spindle assembly for a lawnmower wherein a horizontal mower blade is driven by a motor that is interconnected with the blade by means of the spindle assembly, the spindle assembly comprising:

a spindle housing having a bore therethrough for a spindle, the bore including a main portion that houses one or more plain bearings and an enlarged end portion positioned at an end of the main portion;

one or more plain bearings positioned in the main portion of the spindle housing, the plain bearing being formed from one or more of the spindle housing and an annular plain bearing insert mounted in the housing;

a spindle rotatably mounted in the spindle housing, the spindle having a main portion that engages the plain bearing in the main portion of the spindle housing, the spindle being connected to a mower blade and motor for driving the mower blade;

an impeller washer mounted on an end portion of the spindle located in the end portion of the spindle housing, the impeller washer being connected to the spindle so as to be rotated by rotation of the spindle, the impeller washer extending radially outwardly past an outer periphery of the spindle, the impeller washer being shaped to impel outwardly lubricating fluid that contacts the impeller washer while the washer is rotating, producing an outward pumping force on the fluid; and the spindle housing having a fluid return conduit extending from an inlet in the end portion of the spindle housing spaced outwardly from the spindle to an outlet at an end of the main portion of the spindle housing on an opposite side of the plain bearings, such that the impeller washer recirculates lubricating fluid, across the bearings from one end of the main portion to the other and then recirculates the fluid back to the one end to flow over the bearings again.

\* \* \* \* \*